US011989671B1

(12) United States Patent
Li et al.

(10) Patent No.: US 11,989,671 B1
(45) Date of Patent: May 21, 2024

(54) METHOD FOR CONSTRUCTING LOCOMOTIVE COLLABORATIVE TRANSPORTATION SCHEDULING SYSTEM BASED ON CYBER-PHYSICAL FUSION

(71) Applicant: SHANDONG UNIVERSITY OF SCIENCE AND TECHNOLOGY, Qingdao (CN)

(72) Inventors: Wenhong Li, Qingdao (CN); Jinyu Ma, Qingdao (CN); Yanliang Sun, Qingdao (CN); Jitian Pei, Qingdao (CN); Dan Kang, Qingdao (CN); Yongliang Song, Qingdao (CN); Peng Yang, Qingdao (CN); Peng Sun, Qingdao (CN); Boyun Li, Qingdao (CN); Yi Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/470,328

(22) Filed: Sep. 19, 2023

(30) Foreign Application Priority Data

Mar. 16, 2023 (CN) .......................... 202310255208.7

(51) Int. Cl.
G06Q 10/0631 (2023.01)
(52) U.S. Cl.
CPC .............................. G06Q 10/06311 (2013.01)
(58) Field of Classification Search
None
See application file for complete search history.

(56) References Cited

U.S. PATENT DOCUMENTS 11,072,356 B2 * 7/2021 Mong ..................... H04L 67/12
11,318,969 B2 * 5/2022 Kafzan ................... G06F 21/57
(Continued)

FOREIGN PATENT DOCUMENTS

| CN | 104657610 A | 5/2015 |
| CN | 112415959 A | 2/2021 |
| CN | 113703969 A | 11/2021 |

OTHER PUBLICATIONS

Fraga-Lamas P, Fernández-Caramés TM, Castedo L. Towards the Internet of Smart Trains: A Review on Industrial IoT-Connected Railways. Sensors (Basel). Jun. 21, 2017;17(6) (Year: 2017).*

(Continued)

*Primary Examiner* — Folashade Anderson

(57) ABSTRACT

The present disclosure discloses method for constructing a locomotive collaborative transportation scheduling system based on cyber-physical fusion, which provides a solution for multi-processor coordinated control of locomotive scheduling. The method includes the following steps: step 1, planning the actual on-site location of the device; step 2: constructing a distributed cyber-physical system collaborative architecture; step 3: describing the information transmission relationship between physical devices in a matrix manner to construct an information collaboration computing model; step 4: analyzing and selecting the matching controller type according to the device function implementation program; step 5: writing the controller function scheduling program to complete the construction of the locomotive collaborative transportation scheduling cyber-physical system, and realizing the locomotive automatic scheduling through this system.

3 Claims, 2 Drawing Sheets

(56) References Cited

U.S. PATENT DOCUMENTS

2020/0169574 A1    5/2020  Yan et al.
2020/0412767 A1*  12/2020  Crabtree ............. H04L 63/1441
2022/0089237 A1*   3/2022  Sverdlov ................ B25J 9/1697
2022/0197706 A1*   6/2022  Salfity ................... G06F 9/5027

OTHER PUBLICATIONS

LI Wen-hong et al., "Research on Cyber-physical Models of Underground Locomotive Dispatching", Science of Computer Programming, Jan. 15, 2022, pp. 1-19.
Ma Jinyu et al., "Research on interaction model of underground locomotive scheduling cyber physical systemI", Nov. 17, 2022, pp. 1-9.

\* cited by examiner

Step 1, planning an actual site location where a device is located based on an actual physical environment on site Step 2, planning a connection mode and an information transmission path of the device according to the actual site location of the device, and constructing a distributed cyber-physical system collaborative architecture based on cyber-physical system Step 3, describing an information transmission relationship between physical devices in a matrix manner based on a cyber-physical system collaboration architecture and an information transmission path between the physical devices, and constructing an information collaboration computing model Step 4, analyzing data space and execution time required for program operation according to a device function implementation program, analyzing an information communication interface and an information transmission delay required by a controller according to a collaboration architecture of the cyber-physical system and information interaction contents between the devices; selecting a matching controller type based on a maximum data space and an execution time required for the program operation, the information communication interface and the information transmission delay, combined with real-time and reliability required by the cyber-physical system Step 5, writing a controller function scheduling program in combination with a locomotive scheduling strategy to complete the construction of a locomotive collaborative transportation scheduling cyber-physical system, and realizing a locomotive automatic scheduling through locomotive collaborative transportation scheduling cyber-physical system

FIG. 1

METHOD FOR CONSTRUCTING LOCOMOTIVE COLLABORATIVE TRANSPORTATION SCHEDULING SYSTEM BASED ON CYBER-PHYSICAL FUSION

CROSS-REFERENCE TO RELATED APPLICATIONS

This application claims priority to Chinese Application No. 202310255208.7, filed on Mar. 16, 2023, entitled method for constructing locomotive collaborative transportation scheduling system based on cyber-physical fusion. These contents are hereby incorporated by reference.

TECHNICAL FIELD

The present disclosure relates to the field of automatic control, in particularly to a method for constructing a locomotive collaborative transportation scheduling system based on cyber-physical fusion.

BACKGROUND

The cyber-physical system (CPS) is a highly integrated, monitorable and controllable engineering system with communication, computing and control as the core. Facing the complex and changeable physical environment, the cyber-physical system needs to simultaneously meet the requirements for task coordination of executing devices and sensing devices with different time scales and different processing precision. Therefore, the cyber-physical system can only achieve diversified functions by relying on advanced communication technology and control technology. In the cyber-physical system, the data processing and information communication of system device are more complex. How to select the appropriate controller and determine the information interaction between controllers is particularly significant. At the same time, in the complex and changeable physical environment underground, there are multiple terminal intelligent processors working at the same time. The existing cyber-physical system faces the problems of multiple types of data acquisition, poor real-time acquisition, difficult protocol compatibility, and lacks of models and collaboration mechanisms for collaborative control between controllers. Therefore, a cyber-physical system and a cooperative work method for information collaborative computing between devices are urgently needed.

SUMMARY

In order to solve the above problems, the present provides a method for constructing a locomotive collaborative transportation scheduling system based on cyber-physical fusion, which builds a complete locomotive collaborative transportation scheduling cyber-physical system based on information collaboration computing model, cyber-physical system collaborative architecture and controller function scheduling program. By using model collaboration and information collaboration, the type selection and programing of controller is realized, improving the real-time processing capability of the system and achieving safe and efficient automatic scheduling.

The technical solution of the present disclosure is as follows:

A method for constructing a locomotive collaborative transportation scheduling system based on cyber-physical fusion, including the following steps:

Step 1, planning an actual site location where a device is located based on an actual physical environment on site;

Step 2, planning a connection mode and an information transmission path of the device according to the actual site location of the device to construct a distributed cyber-physical system collaborative architecture based on cyber-physical system;

Step 3, describing an information transmission relationship between physical devices in a matrix manner based on a cyber-physical system collaboration architecture and an information transmission path between physical devices to construct an information collaboration computing model;

Step 4, analyzing data space and execution time required for program operation according to a device function implementation program, analyzing an information communication interface and an information transmission delay required by a controller according to the cyber-physical system collaboration architecture and information interaction contents between the physical devices; selecting a matching controller type based on a maximum data space and an execution time required for the program operation, the information communication interface and the information transmission delay, combined with real-time and reliability required by the locomotive cooperative transportation scheduling system;

Step 5, writing a controller function scheduling program in combination with a locomotive scheduling strategy to complete the construction of a locomotive collaborative transportation scheduling cyber-physical system, and realizing a locomotive automatic scheduling through locomotive collaborative transportation scheduling cyber-physical system.

The advantageous technical effects brought by the present disclosure are shown as below:

After the terminal processor program is written, it runs in the cyber-physical system of locomotive collaborative transportation scheduling. Compared with the traditional system, the response time of route switching request is reduced, the locomotive operation time is significantly reduced, the reliability of processor operation is improved, and the regional distributed control decision-making ability is enhanced.

This method clearly describes the information interaction process between controllers, ensures the logical rigor of system information interaction, optimizes the tasks and information transmission contents of the scheduling system terminal controller, and provides a method for multi-processor coordinated control of locomotive scheduling.

BRIEF DESCRIPTION OF THE DRAWINGS

FIG. 1 is a flowchart of a method for constructing a locomotive collaborative transportation scheduling system based on cyber-physical fusion of the present disclosure.

DETAILED DESCRIPTION OF THE EMBODIMENTS

Figure 2:
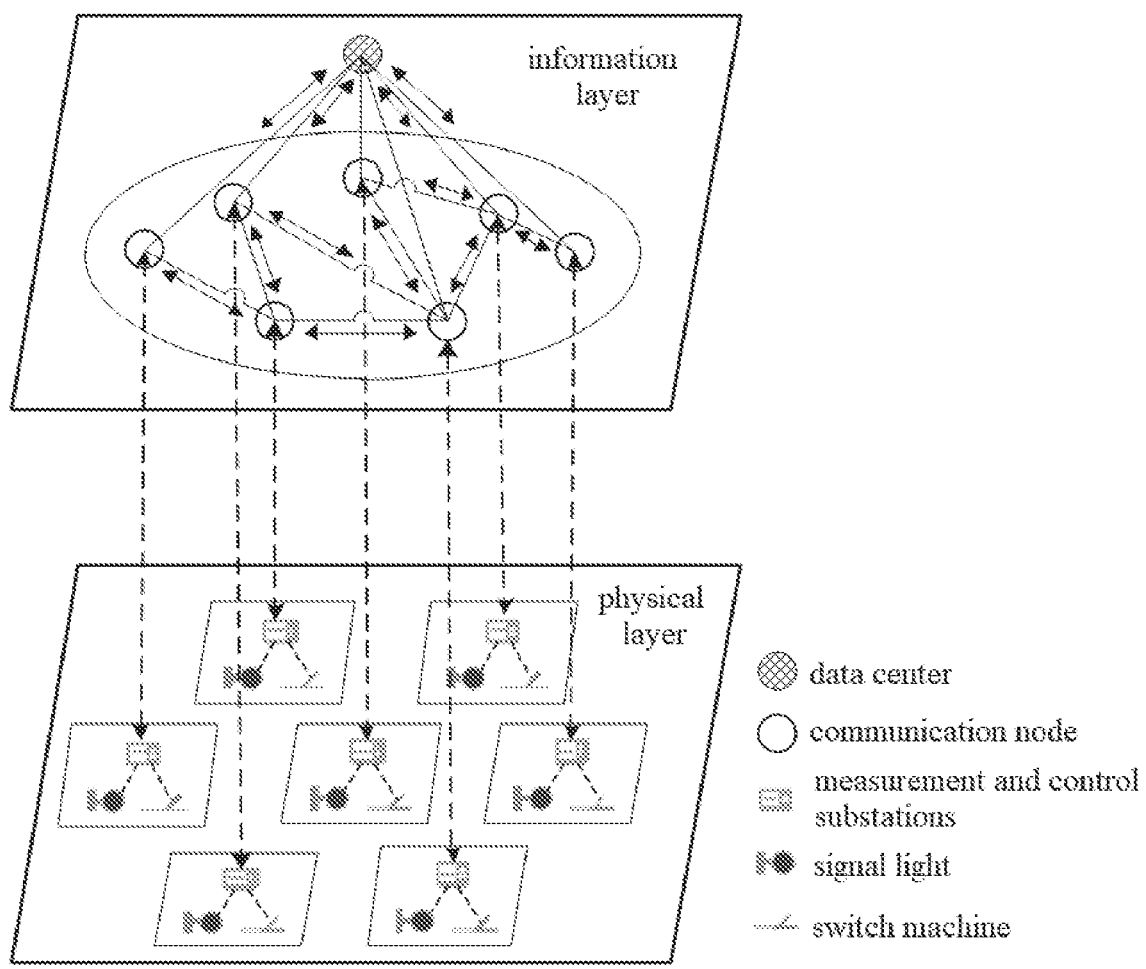
FIG. 2 is the schematic diagram of the cyber-physical system of the coal mine locomotive collaborative transportation scheduling of the embodiment of the present disclosure.

The following is a further detailed illustration of the present disclosure in conjunction with the accompanying drawings and specific embodiments:

In the complex physical environment underground, there is a situation where multiple terminal intelligent processors work at the same time. In this situation, the data processing and information communication of the system device are more complex. Therefore, it is particularly important to choose a matching device controller and determine the information exchange process between controllers.

The present disclosure provides a method for constructing a locomotive collaborative transportation scheduling system based on cyber-physical fusion. In this method, based on the information exchange process of the scheduling system terminal processor during the scheduling process, the physical functions that the system edge devices need to implement are analyzed, the functions of different network node terminal processors are optimized, the information load analysis of the program tasks implemented by their functions is carried out, and the execution time required for function implementation is calculated. The information transmission content and the interaction mode between different controllers in the scheduling system are constructed, describing the information transmission relationship between physical devices in a matrix manner, which improves the reliability of information transmission in the scheduling system and reduces the delay time of information transmission, so as to solve the problem of difficult task division and complex information communication among multiple terminal processors in the underground locomotive transportation scheduling system, and achieve safe and efficient automatic scheduling.

As shown in FIG. 1, the method of the disclosure realizes the automatic scheduling of locomotives by constructing a complete locomotive collaborative transportation scheduling system based on cyber-physical fusion, which includes the following steps:

Step 1, planning an actual site location where a device is located based on an actual physical environment on site; the specific step is as below:

determining the physical devices required for the required physical location based on the actual physical environment on site, and planing the actual location of the device on site.

Based on the actual physical environment of the locomotive transportation site, planing the number and location of measurement and control substations, signal lights, and switch machines required for locomotive transportation. In the embodiment of the present disclosure, the locomotive transportation layout planned based on the actual physical environment on site is as follows: a total of three measurement and control substations SC1, SC2, and SC3 are set up. Wherein the measurement and control substation SC1 includes three signal lights: signal light 1.1, signal light 1.2, signal light 1.3, and two switch machines: switch machine 1.4 and switch machine 1.5. The measurement and control substation SC2 includes three signal lights: signal light 2.1, signal light 2.2, signal light 2.3, and switch machine 2.4. The measurement and control substation SC3 includes two signal lights, signal light 3.1 and signal light 3.2, and switch machine 3.3.

Step 2, planning a connection mode and an information transmission path of the device according to the actual site location of the device, and constructing a distributed cyber-physical system collaborative computing architecture based on cyber-physical system; the specific step is as below:

Step 2.1, connecting signal lights and switch machines with the nearest measurement and control substations through the locations of the physical devices on site, wherein a connection mode is star connection; planing an device connection mode and an information transmission path; applying the cyber-physical system theory to establish a distributed structure for an interaction between a information layer and a physical layer of terminals of the locomotive collaborative transportation scheduling cyber-physical system to build compositions and functions of the information layer and the physical layer; researching a information process that each terminal processor needs to exchange and transmit based on a functional requirement of different physical devices, and building an information interaction model.

The coal mine underground locomotive collaborative transportation scheduling cyber-physical system shown in FIG. 2 includes the following types of the physical devices: signal lights, switch machines, and measurement and control substations. Through the connection method between the physical devices in FIG. 2, multiple terminal processors with different functions form a distributed locomotive collaborative transportation scheduling cyber-physical system through a network. According to the definition of the cyber-physical system (CPS), it is divided into information layer and physical layer to describe the information interaction relationship between the physical devices.

Wherein, the physical layer of the cyber-physical system is actual physical devices controlled by the controller in the system and a communication network connecting these devices. The actual physical devices includes signal lights, switch machines, and measurement and control substations. The communication network is a hybrid network combining ring networks and star networks. Each device in the physical layer of the cyber-physical system is equipped with a physical transmission port for information interaction with other devices, which is responsible for realizing actual physical behaviors of the system.

The information layer of the cyber-physical system includes a data center and a plurality of communication nodes. The information layer of the cyber-physical system consists of a plurality of virtual physical devices realized by the actual physical devices through real-time multitasking programming and the information transmitted by each device. And the information layer of the cyber-physical system is configured to process and transmit various information in the system and generate corresponding information transmission content, which is responsible for implementing information interaction between the physical devices in the system.

Step 2.2, forming the edge computing groups composed of the measurement and control substations and their subordinate signal lights and switch machines according to a structure of the locomotive collaborative transportation scheduling cyber-physical system, wherein the edge computing groups exchange information through the backbone network, and the information coordinated control of a plurality of controllers between a plurality of the measurement and control substations is achieved.

Step 2.3, building the collaborative computing architecture of the locomotive collaborative transportation scheduling cyber-physical system underground coal mine, wherein the collaborative computing architecture includes an application layer, a cloud data layer, a backbone network layer, a local network layer and a physical layer. Wherein the application layer includes a monitoring center and a control center; the cloud data layer includes the cloud data center; the backbone network layer includes a plurality of switch machines which are connected through ethernet; the local network layer includes a data processing center, a measurement and control substation, a controller local area network communication, a positioning base station, and an ultra wideband wireless carrier communication; and the physical layer includes an execution device, a sensing device, and an onboard device. The measurement and control substation conducts interactive communication with the subordinated executive device and sensing device through the star network composed of the controller local area network communication, the positioning base station receives data information of the onboard device through the ultra wideband wireless carrier communication; and different measurement and control substations or positioning base stations exchange information through an ethernet ring network composed of switch machines, and transmit information in the cloud data center.

Step 3, describing an information transmission relationship between the physical devices in a matrix manner based on a cyber-physical system collaboration architecture and an information transmission path between the physical devices, and constructing an information collaboration computing model.

The information transmission relationship between the physical devices is described in a matrix manner to build an information collaborative computing model, taking the nodes that generate and process data as network nodes, taking the data transmission and processing process in the system as network paths, so as to generate the network directed graph inside the system, build the information collaborative computing model of the edge computing groups and the system information collaborative computing model, and describe the relationship between the network nodes in system.

The network directed graph describes a communication relationship between system device controllers, and edges in the network directed graph represent the direction of information flow between the physical devices.

In the network directed graph, when the controller acts as a network node, the edge device controller often processes the data. Due to capacity limitations and consumption costs (such as time and energy) when the edge device acts as a network node, in order to convert it into a directed network without weight constraints, this method is called network node splitting. This method includes the following steps: (1) Splitting each virtual device network node v into two vertices v' and v"; (2) taking vertex v' as a source point, connecting the outgoing arc of the original network node v to the vertex v'; (3) taking vertex v" as a sink point, connecting the incoming arc of the original network node V to the vertex v"; (4) connecting an arc from v' to v", and the weight value of the arc is the weight value of the original network node v.

The network directed graph describes the communication relationship between the physical devices. According to the above description, the collaboration relationship between the physical devices in the edge computing group is built as the edge information collaborative computing model. Assuming that there are m of edge devices in an edge computing group, a network node splitting method is used to split nodes, the number of network vertices is 2m, an information adjacency matrix $T'[a_{ij}]_{2m \times m3}$ between the vertices is constructed according to two split vertices v' and v", wherein $a_{ij}$ (i=1, 2, . . . , m, . . . , 2m, j=1, 2, . . . , m, . . . , 2m) is an adjacency relationship between vertices, when information flows from a vertex i to a vertex j, $a_{ij}$ is 1, otherwise $a_{ij}$ is 0. The specific form of the information adjacency matrix T' is as follows:

$$T' = \begin{bmatrix} a_{11} & a_{12} & \cdots & a_{1m} & \cdots & a_{1(2m)} \\ a_{21} & a_{22} & \cdots & a_{2m} & \cdots & a_{2(2m)} \\ \vdots & \vdots & & \vdots & & \vdots \\ a_{m1} & a_{m2} & \cdots & a_{mm} & \cdots & a_{m(2m)} \\ \vdots & \vdots & & \vdots & & \vdots \\ a_{(2m)1} & a_{(2m)2} & \cdots & a_{(2m)m} & \cdots & a_{(2m)(2m)} \end{bmatrix} \quad (1)$$

Wherein, the direction of information flow between two split nodes is fixed, and the direction of information flow can only flow from the vertex v' in each node to the vertex v". Therefore, the above matrix is simplified and partitioned as follows:

$$T' = \begin{bmatrix} T^{m' \times m'} & T^{m' \times m''} \\ T^{m'' \times m'} & T^{m'' \times m''} \end{bmatrix} = \begin{bmatrix} 0 & 1 \\ T^{m' \times m'} & 0 \end{bmatrix} \quad (2)$$

Wherein, m' represents the number of edge devices of the vertices v' after using the network node splitting method, m" represents the number of edge devices of the vertices v" after using the network node splitting method, $T^{m' \times m'}$ represents a matrix module between split vertices v' and split vertices v', $T^{m' \times m''}$ represents a matrix module between the split vertices v' and the split vertices v", $T^{m'' \times m'}$ represents a matrix module between the split vertices v" and the split vertices v', and $T^{m'' \times m''}$ represents a matrix module between the split vertices v" and the split vertices v".

Wherein, there are still n of non-split network nodes in the edge computing group, the information of the edge devices flows from the vertices v" to the non-split network nodes, and the information of the non-split network nodes flows from the vertices v' of the edge devices. Therefore, the edge information adjacency matrix T' is processed to obtain the edge information collaborative computing model of the entire edge computing group, as shown in formula (3), then further simplifying and block processing, so as to obtain the model matrix shown in formula (4), which is defined as the full information adjacency matrix T.

$$T = \begin{bmatrix} a_{11} & a_{12} & \cdots & a_{1(2m)} & \cdots & a_{1(2m+n)} \\ a_{21} & a_{22} & \cdots & a_{2(2m)} & \cdots & a_{2(2m+n)} \\ \vdots & \vdots & & \vdots & & \vdots \\ a_{(2m)1} & a_{(2m)2} & \cdots & a_{(2m)(2m)} & \cdots & a_{(2m)(2m+n)} \\ \vdots & \vdots & & \vdots & & \vdots \\ a_{(2m+n)1} & a_{(2m+n)2} & \cdots & a_{(2m+n)m} & \cdots & a_{(2m+n)(2m+n)} \end{bmatrix} \quad (3)$$

$$T = \begin{bmatrix} T^{m' \times m'} & T^{m' \times m''} & T^{m' \times n} \\ T^{m'' \times m'} & T^{m'' \times m''} & T^{m'' \times n} \\ T^{n \times m'} & T^{n \times m''} & T^{n \times n} \end{bmatrix} = \begin{bmatrix} 0 & 1 & 0 \\ T^{m'' \times m'} & 0 & T^{m'' \times n} \\ T^{n \times m'} & 0 & 0 \end{bmatrix} \quad (4)$$

Wherein, $T^{m' \times m'}$ represents a matrix module between split vertices v' and split vertices v', $T^{m' \times m''}$ represents a matrix module between the split vertices v' and the split vertices v', $T^{m' \times n}$ represents a matrix module between the split vertices v' and the non-split network nodes, $T^{m'' \times m'}$ represents a matrix module between the split vertices v" and the split vertices v', $T^{m'' \times m''}$ represents a matrix module between the split vertices v" and the split vertices v", $T^{m'' \times n}$ represents a matrix module between the split vertices v" and the non-split network nodes, $T^{n \times m'}$ represents a matrix module between the non-split network nodes and the split vertices v', $T^{n \times m''}$ represents a matrix module between the non-split network nodes and the split vertices v", and $T^{n \times n}$ represents a matrix module between the non-split network nodes.

The system collaborative computing model is the full information adjacency matrix of the edge information collaborative computing model as the sub module to be called in the full information adjacency matrix of the system. The data center on the cloud realizes the information collaborative computing of the entire network system by calling the edge computing group collaborative computing sub module. The edge computing group collaborative computing sub modules can realize the collaborative computing between edge computing groups. The method includes the following steps:

Step 3.1, unified numbering of network nodes of the edge computing group under system information collaboration; specifically, in the case of multiple edge computing groups, the network nodes of different edge computing groups are numbered uniformly in the system; supposing that the network nodes in an edge computing group 1 are numbered from 1 to p, wherein there are $m_1$ of split nodes and $n_1$ of non-split nodes; the network nodes of an edge computing group 2 are numbered from p+1 to p+q, wherein there are $m_2$ of split nodes and $n_2$ of non-split nodes.

Step 3.2, Constructing the information adjacency matrix between edge computing groups under system information collaboration. specifically, in the construction of the system information collaborative computing model, the network nodes of the entire system remain unchanged, but due to the particularity of the controller and the information processing center, the information relationship between edge computing groups is only related to the nodes split by the controller, and the direction of information transmission can only flow from the vertex v" of the current control center node to the vertex v' of the next control center node; the information adjacency matrix between edge computing groups is Z, and the information adjacency matrix $Z_{12}$ between the edge computing group 1 and the edge computing group 2 in Z is:

$$Z_{12} = \begin{bmatrix} Z_{12}^{m'_1 \times m'_2} & Z_{12}^{m'_1 \times m''_2} & Z_{12}^{m'_1 \times n_2} \\ Z_{12}^{m''_1 \times m'_2} & Z_{12}^{m''_1 \times m''_2} & Z_{12}^{m''_1 \times n_2} \\ Z_{12}^{n_1 \times m'_2} & Z_{12}^{n_1 \times m''_2} & Z_{12}^{n_1 \times n_2} \end{bmatrix} = \begin{bmatrix} 0 & 0 & 0 \\ Z_{12}^{m''_1 \times m'_2} & 0 & Z_{12}^{m''_1 \times n_2} \\ Z_{12}^{n_1 \times m'_2} & 0 & Z_{12}^{n_1 \times n_2} \end{bmatrix}; \quad (5)$$

Wherein, $m'_1$ represents the vertex v' of the edge computing group 1 after splitting, $m'_2$ represents the vertex v' of the edge computing group 2 after splitting, $m''_1$ represents the vertex v" of the edge computing group 1 after splitting, $m''_2$ represents the vertex v" of the edge computing group 2 after splitting; $Z_{12}^{m'_1 \times m'_2}$ represents a matrix module between the vertex v' of the edge computing group 1 after splitting and the vertex v' of the edge computing group 2 after splitting, $Z_{12}^{m'_1 \times m''_2}$ represents a matrix module between the vertex v' of the edge computing group 1 after splitting and the vertex v" of edge computing group 2 after splitting, $Z_{12}^{m'_1 \times n_2}$ represents a matrix module between the vertex v' of the edge computing group 1 after splitting and the non-split nodes of the edge computing group 2, $Z_{12}^{m''_1 \times m'_2}$ represents a matrix module between the vertex v" of the edge computing group 1 after splitting and the vertex v' of the edge computing group 2 after splitting, $Z_{12}^{m''_1 \times m''_2}$ represents a matrix module between the vertex v" of the edge computing group 1 after splitting and the vertex v" of the edge computing group 2 after splitting, $Z_{12}^{m''_1 \times n_2}$ represents a matrix module between the vertex v" of the edge computing group 1 after splitting and the non-split nodes of the edge computing group 2, $Z_{12}^{n_1 \times m'_2}$ represents a matrix module between the non-split nodes of the edge computing group 1 and the vertex v' of the edge computing group 2 after splitting, $Z_{12}^{n_1 \times m''_2}$ represents a matrix module between the non-split nodes of the edge computing group 1 and the vertex v" of the edge computing group 2 after splitting, and $Z_{12}^{n_1 \times n_2}$ represents a matrix module between the non-split nodes of the edge computing group 1 and the non-split nodes of the edge computing group 2;

Step 3.3, constructing the full information adjacency matrix of the whole locomotive cooperative transportation scheduling system under the system information collaboration; a construction process of an unified computing model of a whole cloud-side locomotive network system is as follows: conducting node processing to a cloud data center through the network node splitting method, the cloud data center is regarded as the edge computing group with only one controller, and all the edge computing groups in the system are obtained as the full information adjacency matrix W of the system according to the methods of equations (4) and (5), as shown in equation (6);

$$W = \begin{bmatrix} T_1 & Z_{12} & \cdots & Z_{1(k+1)} \\ Z_{21} & T_2 & \cdots & Z_{2(k+1)} \\ \vdots & \vdots & \ddots & \vdots \\ Z_{(k+1)1} & Z_{(k+1)2} & \cdots & T_{k+1} \end{bmatrix} \quad (6)$$

Wherein, Z represents an information adjacency matrix between the edge computing groups, k represents the total number of edge computing groups after removing the cloud data center in the system, k+1 represents the cloud data center of the system; $T_1$ represents a full information connection matrix of the edge computing group 1, $T_2$ represents a full information connection matrix of the edge computing group 2; $T_{k+1}$ represents a full information connection matrix of a cloud data processing center; $Z_{12}$ represents an information connection matrix between the edge computing group 1 and the edge computing group 2, $Z_{21}$ represents an information connection matrix between the edge computing group 2 and the edge computing group 1; $Z_{(k+1)1}$ represents an information connection matrix between the cloud data center of the system and the edge computing group 1, $T_{1(k+1)}$ represents an information connection matrix between the edge computing group 1 and the cloud data processing center; $Z_{2(k+1)}$ represents an information connection matrix between the edge computing group 2 and the cloud data processing center; and $Z_{(k+1)2}$ represents an information connection matrix between the cloud data processing center and the edge computing group 2.

Step 4, analyzing data space and execution time required for program operation according to a device function implementation program; analyzing an information communication interface and an information transmission delay required by a controller according to a collaboration architecture of the cyber-physical system and information interaction contents between the physical devices; selecting a matching controller type based on a maximum data space and an execution time required for the program operation, the information communication interface and the information transmission delay, combined with real-time and reliability required by the locomotive cooperative transportation scheduling system.

Analyzing and dividing functions of the system based on the information collaboration computing model of the system and according to system functional requirements; constructing physical function modules and physical interfaces by analyzing the functions that different edge devices of the system need to realize to collect different data information and execute different command functions; analyzing functions of the physical devices to realize the information transmission content between the controllers, calculating the information load to realize the functions, and further calculating the time required for instruction execution.

Taking the edge computing group composed of the measurement and control substation SC2 and its subordinate signal lights and switch machines as an example, the information physics interaction model under the measurement and control substation SC2 is mainly the information physics interaction mode between the measurement and control substation SC2 and signal lights 2.1, 2.2, 2.3 and 2.4.

The measurement and control substation includes network interfaces, network communication modules, processors, controller local area network communication physical modules, and controller local area network communication interfaces, which are connected in sequence. The processors are also connected to memory, which stores the programs for operating system, section locking, route locking, section unlocking, and section occupation logic processing functions. When the measurement and control substation transmits information, it receives the current status information and online information of the device, and sends the execution status information of the device.

Wherein, the network interface is used for communication between the current measurement and control substation and other measurement and control substations, the cloud data processing centers, and the positioning base stations.

The network communication module is used for the measurement and control substation to achieve basic network communication functions.

The processor is used for parallel processing of programs with functions such as section locking, route locking, section unlocking, and section occupancy logic processing, to achieve a locomotive collaborative transportation scheduling method based on cyber-physical fusion.

The controller local area network communication physical module is used for the measurement and control substation to achieve controller local area network communication function.

The controller local area network communication interface is used for controller local area network communication between measurement and control substations and its subordinate signal lights, switch machines, and other device.

The memory is used to store computer programs running on the processor and store data generated by calculations. The operating system in memory refers to the management program that enables the required functions to be parallel; the section locking function refers to the use of scheduling signal light device to prohibit locomotives from entering the section; the route locking function refers to the use of scheduling signal lights and switch machine device to prohibit locomotives from entering the route; the section unlocking function refers to the use of scheduling signal lights to achieve the change from locomotive prohibited entry to locomotive allowed entry in the section; and the section occupancy logic processing function refers that the measurement and control substation determines the required task execution function and data calculation of the measurement and control substation according to the logic analysis of the actual physical environment, to schedule the subordinate signal lights and switch machines, and collaborate with the scheduling of the other measurement and control substations to realize the automatic locomotive scheduling and processing.

The signal lights are display devices that display whether a locomotive can operate normally, including a communication interface, a communication function physical module, a processor, and a status display physical execution module, which are sequentially connected. The processor is also connected to memory, which includes the operating system, the signal status control function, the signal status detection function, and the device online detection function. When the signal light transmits information, it receives signal status display information and sends current signal display status information and device online information.

Wherein, the communication interface is used for communication between the signal lights and the corresponding measurement and control substation;

The communication function physical module is used to achieve communication between signal lights and the measurement and control substation;

The processor is used for parallel processing of programs with signal state control, signal state detection, and device online detection functions;

The status display physical execution module is used to display signals, enabling the device to display the required signals;

The memory is used to store computer programs running on processors, data generated by calculations, and instruction information executed by the physical devices.

The signal light terminal controller mainly implements three functions, namely signal state control function, signal state detection function, and device online detection function.

The signal status control function is the function of controlling the signal light to display status signals. The signal light mainly has two states, namely the red light state and the green light state. The measurement and control substation controller achieves signal control function by sending the status information that the signal light needs to display to the signal light terminal controller.

The signal status detection function is the signal display status detection function, mainly realizing the display status of the detection signal light. The signal light terminal controller achieves signal detection function by sending information on the current signal light display status to the measurement and control substation controller.

The device online detection function is the function of detecting whether the signal lights are online normally, and timely detecting faulty device to prevent serious accidents. The signal light terminal controller sends the normal online information of the device to the measurement and control substation at a fixed time to achieve the device detection function.

The switch machine is a control device that controls switches to achieve various functions, which includes a communication interface, a communication function physical module, a processor, and a connection direction physical execution module. The processor is also connected to memory, which includes an operating system, a switch control function, a switch connection direction detection function, and a device online detection function. When the switch machine transmits information, it receives the direction information of the switch connection and sends the current direction information of switch connection and device online information.

Wherein, the communication interface is used for communication between the switch machines and the corresponding measurement and control substation;

The communication function physical module is used to achieve the communication function between the switch machines and the measurement and control substation;

The processor is used for parallel processing of programs with switch control, switch connection direction detection, and device online detection functions;

The connection direction physical execution module is used to realize the connection of the switch rail and the stock rail, enabling the switch to connect to the required direction of the system;

The memory is used to store computer programs running on processors, data generated by calculations, and instruction information executed by the physical devices.

The switch machine terminal controller mainly implements three functions, namely switch control function, switch connection direction detection function, and device online detection function.

Wherein, the switch control function is the function of controlling the direction of the switch connection, mainly realizing the connection between the switch rail and the stock rail in the switch. The measurement and control substation controller realizes the switch control function by sending information on the direction of the switch that needs to be connected to the switch machine terminal controller.

The switch connection direction detection function mainly realizes the detection of the connection direction between the switch rail and the stock rail in the switch. The switch machine terminal controller realizes the switch detection function by sending information of the current switch connection direction to the measurement and control substation controller.

The device online detection function is the function of detecting whether the switch machine is online normally, and timely detecting faulty device to prevent serious accidents. The switch machine terminal controller sends device normal online information to the measurement and control substation at a fixed time to achieve device detection function.

In the embodiment of the present disclosure, the measurement and control substations SC1, SC2, and SC3 are connected to the backbone network through a switch machine for information physical interaction. The measurement and control substation is a scheduling and logic processing device that enables locomotives to operate normally on the mine track. There are four main functions implemented in the measurement and control substation, namely section locking function, route locking function, section unlocking function, and section occupation logic processing function.

The section locking function is to occupy the section after the locomotive enters the section, preventing other locomotives from entering the section. After receiving the locomotive entry information sent by the positioning device controller, the measurement and control substation controller sends the section locking information to the other end of the section through the section occupancy logic processing. The measurement and control substation realizes the section locking function by sending information that needs to display the red status to the relevant signal light terminal device.

The route locking function is to occupy all sections of the route after the locomotive enters the route, in order to prevent other locomotives from entering the sections of the route. When the measurement and control substation controller receives the locomotive entry information sent by the positioning device controller, it sends the route locking information to other measurement and control substation controllers that can enter the route position through section occupancy logic processing. The measurement and control substation realizes the route locking function by sending information that needs to display a red status to the relevant signal light terminal device.

The section unlocking function is to release the locking signal of the section after the locomotive leaves the section, allowing other locomotives to enter. After receiving the information of leaving the section sent by the positioning device controller, the measurement and control substation controller sends the section unlocking information to the other end of the section through the section occupation logic processing. The measurement and control substation controller realizes the section locking function by sending the information that needs to display the green status to the relevant signal light terminal device.

The section occupancy logic processing function refers to the logic function processing and data calculation analysis performed by the current measurement and control substation when receiving information such as collaborative scheduling, locomotive application for entry, and locomotive departure from other measurement and control substations. The scheduling controller performs the functions to achieve automatic locomotive scheduling.

In the above system, when the controller controls the corresponding physical devices to achieve information collection, instruction execution, and information transmission calculation functions, the instruction execution speed and storage capacity of different controllers are different. The function execution time and the information transmission time are calculated by analyzing the information load of different function execution to select a matching controller.

Assuming that the controller performs instruction execution and information collection, the amount of information generated based on the content of information collection and instruction execution is different. Based on the transmission speed of communication between different controllers, the time required to transmit information is calculated. For example, in the system, the controller has a communication transmission rate of 5 Kbps through the controller local area network and 100 Mbps through ethernet.

Assuming that the execution speed of controller instructions is x (unit: MIPS/Mhz), f (unit: Mhz) is the main frequency of the controller, and $t_1$ (unit: us) is the execution time of a single instruction, then the execution time of a single instruction is $t_1=1/f*x$, the controller function execution time is then calculated based on how many instructions need to be executed for different functions.

The calculation process of information transmission time $t_2$ (unit: ms) is: $t_2=A*10*(1000/S)$; wherein, A (unit: byte) is the number of data transmission bits, and S (unit: bps) is the data transmission rate.

The following only presents and illustrates the partial data of locomotives entering the next section (represented by section 3) from a certain section (represented by section 2 for ease of explanation). This data is the information load analysis results of the section locking function after entering section 3 from section 2. The specific results are as follows:

The source device is a positioning device, the information is that the locomotive has entered section 3, and the destination device is the measurement and control substation SC1. The execution function is locking of section 3, with the data word count of 32 bytes and no inter device transmission delay. The execution function achieves a processing delay of 11.264 us;

The source device is the measurement and control substation SC1, the information is signal locking of section 3, and the destination device is the measurement and control substation SC2. The execution function is locking of section 3, with the data word count of 8 bytes, and the transmission delay between the physical devices is less than 1 ms. The execution function achieves a processing delay of 2.816 us;

The source device is the measurement and control substation SC1, the information is that the signal light 1.2 requires in a red status, and the destination device is the signal light 1.2. The execution function is signal control, with the data word count of 4 bytes, and the transmission delay between the physical devices is 6.4 ms. The processing delay for the execution function is 10.666 us;

The source device is signal light 1.2, the information is that the current signal light 1.2 displays a red status, and the destination device is the measurement and control substation SC1. The execution function is signal detection, with a data word count of 4 bytes, and the transmission delay between the physical devices is 6.4 ms. The processing delay for the execution function is 10.666 us;

The source device is the measurement and control substation SC2, the information is that the signal light 1.2 requires in a red status, and the destination device is the signal light 2.1. The execution function is signal control, with the data word count of 4 bytes, and the transmission delay between the physical devices is 6.4 ms. The execution function achieves a processing delay of 10.666 us;

The source device is the measurement and control substation SC2, the information is that the signal light 1.2 requires in a red status, and the destination device is the signal light 2.3. The execution function is signal control, with the data word count of 4 bytes, and the transmission delay between the physical devices is 6.4 ms. The execution function achieves a processing delay of 10.666 us;

The source device is signal light 2.1, the information is that the current signal light 2.1 displays a red status, and the destination device is the measurement and control substation SC2. The execution function is signal control, with the data word count of 4 bytes, and the transmission delay between the physical devices is 6.4 ms. The execution function achieves a processing delay of 10.666 us;

The source device is signal light 2.3, the information is that the current signal light 2.3 displays a red status, and the destination device is the measurement and control substation SC2. The execution function is signal detection, with the data word count of 4 bytes, and the transmission delay between the physical devices is 6.4 ms. The execution function achieves a processing delay of 10.666 us.

In the present disclosure, a device in the cyber-physical system is defined as a virtual physical device that completes information logic processing functions. Multiple virtual physical devices in the cyber-physical system can be implemented by a device controller in an actual locomotive scheduling cyber-physical system using real-time multitasking programming. The execution functions of a physical device (such as a measurement and control substation, signal light, etc.) represents a virtual physical device that performs information logic processing functions.

To calculate the data transmission delay, in an information network-based control system, the beginning and end of the network path are the data input node and yjr data output node, respectively. For different network paths, according to their transmission characteristics, different weights can be assigned to represent the importance and effectiveness of various data transmission features.

By constructing an information collaborative computing model, the information transmission path between end-to-end devices can be clarified. Assume that it is the maximum transmission delay $T_S$ of end-to-end devices; the processing delay $T_N$ of information within the node; the link delay $T_L$ of information within the transmission path, then the cost function $T_S$ for end-to-end data transmission is:

$$T_S = \sum_{\langle p,q \rangle \in B} T_L(p, q) + \sum_{\langle p,q \rangle \in B} T_N(p, q); \qquad (7)$$

Wherein, B represents the set of all transmission paths from the end to the end link after using the network node splitting method, p represents the starting vertex of the transmission path, q represents the ending vertex of the transmission path.

Step 5, writing a controller function scheduling program in combination with a locomotive scheduling strategy to complete the construction of a locomotive collaborative transportation scheduling cyber-physical system, and realizing a locomotive automatic scheduling through locomotive collaborative transportation scheduling cyber-physical system.

By using the scheduling strategy that can handle the problem of section resource allocation of locomotives, the problem of low scheduling transportation efficiency and road congestion can be solved, such as whether the locomotive can enter the next section under different circumstances, etc. Combining with the required signal lights and the executions of switch machine functions to write the section occupancy logic processing function program in locomotive control, so that the construction of the locomotive coordinated transportation scheduling cyber-physical system is further completed, realizing automatic and safe dispatch of locomotives.

Specific embodiments described above are intended for further explaining objects, technical schemes and beneficial effects of the present disclosure in detail. It should be understood that the above are only specific embodiments of the present disclosure and are not used to limit the present disclosure. Any modification, equivalent substitution, improvement, etc. made within the spirit and principle of this disclosure shall be encompassed within the protection scope of this disclosure.

What is claimed is:

1. A method for constructing a locomotive collaborative transportation scheduling system based on cyber-physical fusion, comprising:

step 1, planning an actual site location where a device is located based on an actual physical environment on site; wherein in step 1, the number and locations of the physical devices required for locomotive transportation are planned based on the actual physical environment on site of the locomotive transportation, and the physical devices comprises signal lights, switch machines, and measurement and control substations;

step 2, planning a connection mode and an information transmission path of the device according to the actual site location of the device, and constructing a distributed cyber-physical system collaborative architecture based on cyber-physical system;

wherein the specific process of step 2 is as follows:
connecting signal lights and switch machines with the nearest measurement and control substations through the locations of the physical devices on site, wherein a connection mode is star connection; planing an device connection mode and an information transmission path; applying the cyber-physical system theory to establish a distributed structure for an interaction between a information layer and a physical layer of terminals of the locomotive collaborative transportation scheduling cyber-physical s stem to build compositions and functions of the information layer and the physical layer; researching a information process that each terminal processor needs to exchange and transmit based on a functional requirement of different physical devices, and building an information interaction model; wherein the physical layer of the cyber-physical system is actual physical devices controlled by the controller in the system and a communication network connecting these physical devices, the actual physical devices comprise signal lights, switch machines, and measurement and control substations; the communication network is a hybrid network combining ring networks and star networks; each device in the physical layer of the cyber-physical system is equipped with a physical transmission port for information interaction with other physical devices, which is responsible for realizing actual physical behaviors of the system; the information layer of the cyber-physical system comprises a data center and a plurality of communication nodes, the information layer of the cyber-physical system consists of a plurality of virtual physical devices realized by the actual physical devices through real-time multitasking programming and the information transmitted by each device; and the information layer of the cyber-physical system is configured to process and transmit various information in the system and generate corresponding information transmission content, which is responsible for implementing information interaction between the physical devices in the system;

forming the edge computing groups composed of the measurement and control substations and their subordinate signal lights and switch machines according to a structure of the locomotive collaborative transportation scheduling cyber-physical system, wherein the edge computing groups exchange information through the backbone network, and a plurality of the measurement and control substations achieve information coordinated control of a plurality of controllers;

building the collaborative architecture of the cyber-physical system of a coal mine underground locomotive collaborative transportation scheduling, wherein the collaborative architecture comprises an application layer, a cloud data layer, a backbone network layer, a local network layer and a physical layer; wherein the application layer comprises a monitoring center and a control center; the cloud data layer comprises the cloud data processing center; the backbone network layer comprises a plurality of switch machines connected through ethernet; the local network layer comprises a data processing center, a measurement and control substation, a controller local area network communication a positioning base station, and an ultra wideband wireless carrier communication; the physical layer comprises an execution device, a sensing device, and an onboard device; the measurement and control substation conducts interactive communication with the executive device and the sensing device subordinated through the star network composed of the controller local area network communication, the positioning base station receives data information of the onboard device through the ultra wideband wireless carrier communication; and different measurement and control substations or positioning base stations exchange information through an ethernet ring network composed of switch machines, and transmit information in the cloud data center;

step 3, describing an information transmission relationship between physical devices in a matrix manner based on a cyber-physical system collaboration architecture and an information transmission path between the physical devices, and constructing an information collaboration computing model;

wherein, a network directed graph is used to construct the information collaboration computing model in step 3, the network directed graph describes a communication relationship between system device controllers, and edges in the network directed graph represent a direction of information flow between the physical devices;

there are m of edge devices in an edge computing group, a network node splitting method is used to split nodes, the number of network vertices is 2m, an information adjacency matrix $T'=[a_{ij}]_{2m \times 2m}$ between the vertices is constructed according to two split vertices v' and v", wherein $a_{ij}$ is an adjacency relationship between vertices, when information flows from a vertex i to a vertex j, $a_{ij}$ is 1, otherwise $a_{ij}$ is 0;

in the edge computing group, there are still n of non-split network nodes, information of the edge devices flows from the vertices v" to the non-split network nodes, and information of the non-split network nodes flows from the vertices v' of the edge devices;

building a full information adjacency matrix T of the edge computing group as following:

$$T = \begin{bmatrix} T^{m' \times m'} & T^{m' \times m''} & T^{m' \times n} \\ T^{m'' \times m'} & T^{m'' \times m''} & T^{m'' \times n} \\ T^{n \times m'} & T^{n \times m''} & T^{n \times n} \end{bmatrix} = \begin{bmatrix} 0 & 1 & 0 \\ T^{m'' \times m'} & 0 & T^{m'' \times n} \\ T^{n \times m'} & 0 & 0 \end{bmatrix}; \quad (1)$$

wherein, m' represents the number of edge devices of the vertices v' after using the network node splitting method, m" represents the number of edge devices of the vertices v" after using the network node splitting method, $T^{m' \times m'}$ represents a matrix module between split vertices v' and split vertices v', $T^{m' \times m''}$ represents a matrix module between the split vertices v' and the split vertices v", $T^{m' \times n}$ represents a matrix module between the split vertices v' and the non-split network nodes, $T^{m'' \times m'}$ represents a matrix module between the split vertices v" and the split vertices v', $T^{m'' \times m''}$ represents a matrix module between the split vertices v" and the split vertices v", $T^{m'' \times n}$ represents a matrix module between the split vertices v" and the non-split network nodes, $T^{n \times m'}$ represents a matrix module between the non-split network nodes and the split vertices v', $T^{n \times m''}$ represents a matrix module between the non-split network nodes and the split vertices v", and $T^{n \times n}$ represents a matrix module between the non-split network nodes;

the matrix of the information collaboration computing model in step 3 is to use the full information adjacency matrix of the edge computing group as a sub module to be called in the full information adjacency matrix of the system, a data center on the cloud realizes a collaborative computing of an entire network system by calling an edge computing group information collaborative computing sub module, the edge computing group information collaborative computing sub module realizes the collaborative computing between the edge computing groups, and the process includes the following steps:

unified numbering of network nodes of the edge computing group under system information collaboration; specifically, in the case of multiple edge computing groups, the network nodes of different edge computing groups are numbered uniformly in the system; supposing that network nodes in an edge computing group 1 are numbered from 1 to p, wherein there are $m_1$ of split nodes and $n_1$ of non-split nodes; network nodes of an edge computing group 2 are numbered from p+1 to p+q, wherein there are $m_2$ of split nodes and $n_2$ of non-split nodes;

constructing the information adjacency matrix between edge computing groups under system information collaboration; specifically, the information adjacency matrix between edge computing groups is Z, and the information adjacency matrix $Z_{12}$ between the edge computing group 1 and the edge computing group 2 in Z is:

$$Z_{12} = \begin{bmatrix} Z_{12}^{m'_1 \times m'_2} & Z_{12}^{m'_1 \times m''_2} & Z_{12}^{m'_1 \times n_2} \\ Z_{12}^{m''_1 \times m'_2} & Z_{12}^{m''_1 \times m''_2} & Z_{12}^{m''_1 \times n_2} \\ Z_{12}^{n_1 \times m'_2} & Z_{12}^{n_1 \times m''_2} & Z_{12}^{n_1 \times n_2} \end{bmatrix} = \begin{bmatrix} 0 & 0 & 0 \\ Z_{12}^{m''_1 \times m'_2} & 0 & Z_{12}^{m''_1 \times n_2} \\ Z_{12}^{n_1 \times m'_2} & 0 & Z_{12}^{n_1 \times n_2} \end{bmatrix}; \quad (2)$$

wherein, $m'_1$ represents the vertex v' of the edge computing group 1 after splitting, $m'_2$ represents the vertex v' of the edge computing group 2 after splitting, $m''_1$ represents the vertex v" of the edge computing group 1 after splitting, $m''_2$ represents the vertex v" of the edge computing group 2 after splitting; $Z_{12}^{m'_1 \times m'_2}$ represents a matrix module between the vertex v' of the edge computing group 1 after splitting and the vertex v' of the edge computing group 2 after splitting, $Z_{12}^{m'_1 \times m''_2}$ represents a matrix module between the vertex v' of the edge computing group 1 after splitting and the vertex v" of edge computing group 2 after splitting, $Z_{12}^{m'_1 \times n_2}$ represents a matrix module between the vertex v' of the edge computing group 1 after splitting and the non-split nodes of the edge computing group 2, $Z_{12}^{m''_1 \times m'_2}$ represents a matrix module between the vertex v" of the edge computing group 1 after splitting and the vertex v' of the edge computing group 2 after splitting, $Z_{12}^{m''_1 \times m''_2}$ represents a matrix module between the vertex v" of the edge computing group 1 after splitting and the vertex v" of the edge computing group 2 after splitting, $Z_{12}^{m''_1 \times n_2}$ represents a matrix module between the vertex v" of the edge computing group 1 after splitting and the non-split nodes of the edge computing group 2, $Z_{12}^{n_1 \times m'_2}$ represents a matrix module between the non-split nodes of the edge computing group 1 and the vertex v' of the edge computing group 2 after splitting, $Z_{12}^{n_1 \times m''_2}$ represents a matrix module between the non-split nodes of the edge computing group 1 and the vertex v" of the edge computing group 2 after splitting, and $Z_{12}^{n_1 \times n_2}$ represents a matrix module between the non-split nodes of the edge computing group 1 and the non-split nodes of the edge computing group 2;

constructing the full information adjacency matrix of the whole locomotive cooperative transportation scheduling system under the system information collaboration; a construction process of an unified computing model of a whole cloud-side locomotive network system is as follows: conducting node processing to a cloud data center through the network node splitting method, the cloud data center is regarded as the edge computing group with only one controller, and all the edge computing groups in the system are obtained as the full information adjacency matrix W of the system according to the methods of equations (1) and (2), as shown in equation (3);

$$W = \begin{bmatrix} T_1 & Z_{12} & \cdots & Z_{1(k+1)} \\ Z_{21} & T_2 & \cdots & Z_{2(k+1)} \\ \vdots & \vdots & \ddots & \vdots \\ Z_{(k+1)1} & Z_{(k+1)2} & \cdots & T_{k+1} \end{bmatrix}; \quad (3)$$

wherein, Z represents an information adjacency matrix between the edge computing groups, k represents the total number of edge computing groups after removing the cloud data center in the system, k+1 represents the cloud data center of the system; $T_1$ represents a full information connection matrix of the edge computing group 1, $T_2$ represents a full information connection matrix of the edge computing group 2; $T_{k+1}$ represents a full information connection matrix of a cloud data processing center; $Z_{12}$ represents an information connection matrix between the edge computing group 1 and the edge computing group 2, $Z_{21}$ represents an information connection matrix between the edge computing group 2 and the edge computing group 1; $Z_{(k+1)1}$ represents an information connection matrix between the cloud data center of the system and the edge computing group 1, $Z_{1(k+1)}$ represents an information connection matrix between the edge computing group 1 and the cloud data processing center; $Z_{2(k+1)}$ represents an information connection matrix between the edge computing group 2 and the cloud data processing center; and $Z_{(k+1)2}$ represents an information connection matrix between the cloud data processing center and the edge computing group 2;

step 4, analyzing data space and execution time required for program operation according to a device function implementation program, analyzing an information communication interface and an information transmission delay required by a controller according to a collaboration architecture of the cyber-physical system and information interaction contents between the physical devices; selecting a matching controller type based on a maximum data space and an execution time required for the program operation, the information communication interface and the information transmission delay, combined with real-time and reliability required by the locomotive cooperative transportation scheduling system;

step 5, writing a controller function scheduling program in combination with a locomotive scheduling strategy to complete the construction of a locomotive collaborative transportation scheduling cyber-physical system, and realizing a locomotive automatic scheduling through locomotive collaborative transportation scheduling cyber-physical system.

2. The method for constructing a locomotive collaborative transportation scheduling system based on cyber-physical fusion according to claim 1, wherein the step 4 further comprises: analyzing and dividing functions of the system based on the information collaboration computing model of the system and according to system functional requirements; constructing physical function modules and physical interfaces by analyzing the functions that different edge devices of the system need to realize to collect different data information and execute different command functions; analyzing functions of the physical devices to realize the information transmission content between the controllers, calculating an information load to realize the functions, and further calculating the time required for instruction execution; when the controller controls the corresponding physical devices to achieve information collection, instruction execution, and information transmission calculation functions, an instruction execution speed and a storage capacity of different controllers are different, a function execution time and an information transmission time are calculated by analyzing the information load of different function execution to select a matching controller.

3. The method for constructing a locomotive collaborative transportation scheduling system based on cyber-physical fusion according to claim 1, wherein the step 5 further comprises: writing a section occupation logic processing function program in locomotive control in combination with function executions of the signal lights and switch machines required, further completing the construction of the cyber-physical system of the locomotive collaborative transportation scheduling, and realizing automatic and safe scheduling of locomotives.

* * * * *